United States Patent
Obergfell et al.

(10) Patent No.: US 7,520,168 B2
(45) Date of Patent: Apr. 21, 2009

(54) VIBRATION REDUCTION FOR HEAD GIMBAL ASSEMBLY TESTING

(75) Inventors: Klaus Obergfell, Minneapolis, MN (US); Steven Ernest Wheeler, Northfield, MN (US); Charles Newell Miller, Apple Valley, MN (US); Brett Robert Herdendorf, Mound, MN (US); Ronald Eldon Anderson, Lakeville, MN (US); Shawn Eric Fosness, Elko, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 208 days.

(21) Appl. No.: 11/517,828

(22) Filed: Sep. 8, 2006

(65) Prior Publication Data

US 2008/0060445 A1    Mar. 13, 2008

(51) Int. Cl.
G01D 11/10 (2006.01)
G01D 3/028 (2006.01)
G01N 19/00 (2006.01)
G11B 15/10 (2006.01)

(52) U.S. Cl. .................. 73/430; 73/865.9; 702/57; 702/108; 360/137

(58) Field of Classification Search .............. 73/856, 73/430, 865.9, 432.1; 702/57, 108
See application file for complete search history.

(56) References Cited

U.S. PATENT DOCUMENTS

| 4,468,074 A | 8/1984 | Gordon |
| 4,520,555 A | 6/1985 | Gyi et al. |
| 4,645,280 A | 2/1987 | Gordon et al. |
| 5,198,945 A | 3/1993 | Blaeser et al. |
| 5,675,082 A | 10/1997 | Marr et al. |
| 5,786,677 A | 7/1998 | Marr |
| 5,844,420 A | 12/1998 | Weber et al. |
| 5,896,735 A | 4/1999 | Wirtz |
| 6,034,851 A | 3/2000 | Zarouri et al. |
| 6,125,003 A | 9/2000 | Tsuda et al. |
| 6,132,554 A | 10/2000 | Traise et al. |
| 6,140,661 A | 10/2000 | Nodelman |

(Continued)

OTHER PUBLICATIONS

Genetec Technology Berhard, "Auto Shunt Machine—Automatic HGA Shunting System," http://genetec.net/machine/Shunting.htm, printed Jan. 7, 2005.

(Continued)

*Primary Examiner*—Harshad Patel
*Assistant Examiner*—Jonathan Dunlap
(74) *Attorney, Agent, or Firm*—Shumaker & Sieffert, P.A.

(57) ABSTRACT

An assembly for testing a head gimbal assembly (HGA) comprises a support platform configured to hold a base plate of the HGA. A base plate of the HGA is mounted on the support platform. The assembly further comprises a channel with an opening adjacent to a tail of the HGA and a vacuum source connected the channel. The vacuum source creates a negative pressure in the channel to secure the tail of the HGA to the opening of the channel. Embodiments of the invention may be useful to inhibit vibration in the tail of an HGA, which may also reduce vibration in the head of the HGA. Reducing vibration in the head of the HGA may increase the accuracy and precision of tests performed on the HGA using the assembly.

13 Claims, 5 Drawing Sheets

U.S. PATENT DOCUMENTS

| | | | |
|---|---|---|---|
| 6,163,950 A | 12/2000 | Bodiker, II et al. | |
| 6,255,750 B1 | 7/2001 | Mohajerani et al. | |
| 6,307,467 B1 | 10/2001 | Starkey et al. | |
| 6,378,195 B1 * | 4/2002 | Carlson | 29/603.3 |
| 6,459,260 B1 | 10/2002 | Bonin et al. | |
| 6,483,670 B1 | 11/2002 | Watanabe | |
| 6,487,028 B1 | 11/2002 | Sri-Jayantha et al. | |
| 6,512,367 B2 | 1/2003 | Liu et al. | |
| 6,566,870 B2 | 5/2003 | Sorenson et al. | |
| 6,580,572 B1 | 6/2003 | Yao et al. | |
| 6,704,165 B2 | 3/2004 | Kube et al. | |
| 6,717,776 B2 | 4/2004 | Boutaghou | |
| 6,789,659 B2 | 9/2004 | Spejna et al. | |
| 6,801,387 B1 | 10/2004 | Rahman | |
| 7,084,654 B2 | 8/2006 | Zhao et al. | |
| 7,094,718 B2 * | 8/2006 | Kwon et al. | 501/103 |
| 7,127,799 B2 | 10/2006 | Girard et al. | |
| 7,159,299 B1 | 1/2007 | McMunigal et al. | |
| 7,345,840 B2 | 3/2008 | Gomez et al. | |
| 7,379,265 B2 | 5/2008 | Wang et al. | |
| 2002/0039253 A1 | 4/2002 | Imai et al. | |
| 2002/0053590 A1 | 5/2002 | Lennard et al. | |
| 2002/0069510 A1 | 6/2002 | Girard et al. | |
| 2002/0075602 A1 | 6/2002 | Mangold et al. | |
| 2003/0107839 A1 | 6/2003 | Smith | |
| 2003/0179493 A1 | 9/2003 | Kim | |
| 2003/0182788 A1 | 10/2003 | Fayeulle et al. | |
| 2004/0213138 A1 | 10/2004 | Kim | |
| 2005/0028353 A1 | 2/2005 | Kidachi et al. | |
| 2005/0209797 A1 * | 9/2005 | Anderson et al. | 702/57 |
| 2006/0006895 A1 * | 1/2006 | Zhao et al. | 324/757 |
| 2007/0115593 A1 * | 5/2007 | Yao | 360/265.9 |

OTHER PUBLICATIONS

Joseph Ogando, "Intelligent Fasteners," Design News, Oct. 20, 2003, pp. 1-5, www.designnews.com/index.asp?layout=article&articleid=CA328003&sst=001&pubdate, printed Oct. 23, 2006.

Anderson et al, "Method and Apparatus For Head Gimbal Assembly Testing," U.S. Appl. No. 11/056,337, filed Feb. 11, 2005.

* cited by examiner

VIBRATION REDUCTION FOR HEAD GIMBAL ASSEMBLY TESTING

TECHNICAL FIELD

The invention relates to testing head gimbal assemblies for disc drives.

BACKGROUND

Head gimbal assemblies (HGAs) are used in disc drives to read and write data to media discs in the disc drive. A disc drive may include one HGA for every recordable disc surface in the drive. For example, a disc drive utilizing both sides of its media discs may include two HGAs for every media disc in the disc drive.

Each HGA in a disc drive commonly includes a head with read and write transducers. The head is supported by a flexible load beam, which attaches to a base plate of the HGA. The base plate connects to a stable platform during operation of the HGA. A tail extends from the base plate to provide electrical connection paths between the head and either disc drive circuitry or testing circuitry.

In the disc drive industry, HGAs may be individually tested prior to installation in a disc drive. Testing an HGA may include positioning the HGA adjacent to a rotating test disc and reading to and/or writing from the test disc with the HGA. The position of the read head on the HGA must remain stable to allow accurate testing of the HGA to reliably determine its suitability for inclusion in a disc drive. For example, performances of an HGA during read and write operations may be dependent the location and skew of the HGA relative to the test disc.

SUMMARY

In general, the invention is directed to techniques for securing tails of head gimbal assemblies (HGAs) during testing. Embodiments of the invention may be useful to inhibit vibration in the tail of an HGA. For example, an tail may be exited by air currents from a rotating test disc. Vibration in the tail of an HGA may be transferred to the head of the HGA, and inhibiting vibration in the tail may reduce vibration in the head which may improve the accuracy and precision of tests performed on the HGA.

Some embodiments of the invention inhibit vibration in a tail of an HGA by protecting tail from airflow generated by a spinning test disc and spindle. Other embodiments of the invention inhibit vibration in a tail of an HGA by constraining the motion of the tail, e.g., embodiments may control the mode shape of the tail by inserting additional node points. Embodiments may also employ a combination of these techniques.

In one embodiment, the invention is directed to an assembly for testing a head gimbal assembly (HGA) comprising a support platform configured to hold a base plate of the HGA. A base plate of the HGA is mounted on the support platform. The assembly further comprises a channel with an opening adjacent to a tail of the HGA and a vacuum source connected the channel. The vacuum source creates a negative pressure in the channel to secure the tail of the HGA to the opening of the channel.

In another embodiment, an assembly for testing a head gimbal assembly (HGA) comprises a support platform configured to hold a base plate of the HGA, wherein a base plate of the HGA is mounted on the support platform and a HGA tail control device including a first component and a second component. The HGA tail control device constrains a tail of the HGA between the first component and the second component.

In an embodiment, an assembly for testing a head gimbal assembly (HGA) comprises a support platform configured to hold a base plate of the HGA, wherein a base plate of the HGA is mounted on the support platform, and a means for inhibiting vibration in a tail of the HGA.

The details of one or more embodiments of the invention are set forth in the accompanying drawings and the description below. In addition to the details described in this summary or the invention, other features, objects, and advantages of the invention will be apparent from the following description and drawings, and from the claims.

DETAILED DESCRIPTION

Figure 1A:
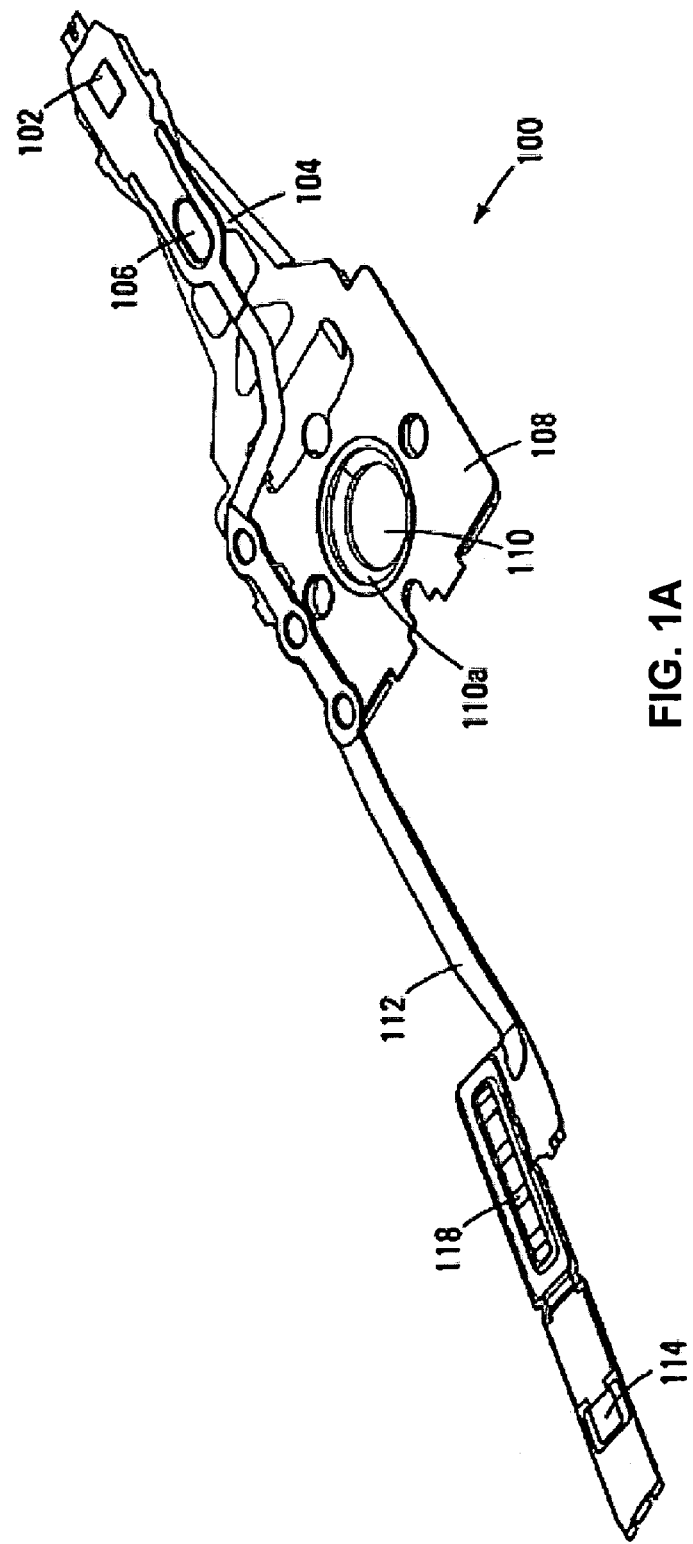
FIGS. 1A-1B illustrate an unmounted head gimbal assembly (HGA).
Figure 1B:
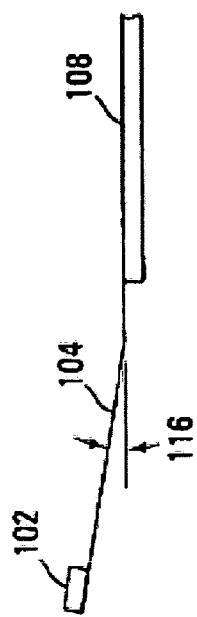

FIGS. 1A-1B illustrate head gimbal assembly (HGA) 100. HGA 100 is used to read data from and write data to a media surface such as a rotating media disc in a disc drive. To increase reliability of a disc drive, HGA 100 should be tested prior to installing HGA 100 into a disc drive. Testing may determine HGA 100 is defective, in which case it will not be used in a disc drive. Testing HGA 100 provides many challenges as HGA 100 may be susceptible to mechanical stress, electro-static discharge (ESD), environmental contamination, and other handling-related issues. Furthermore, HGA 100 must be maintained in a precise position during testing, e.g., adjacent to a rotating media disc, to allow accurate testing of HGA 100.

The basic components of HGA 100 are head 102, load beam 104, tooling hole 106, base plate 108, boss hole 110 with angled surface 110a, and flex circuit tail 112 with flex circuit pads 118 and shunt tab 114. Head 102 flies above the surface of a disc and contains read and write transducers. Load beam 104 is a thin, metal structure and provides the spring force to hold HGA 100 adjacent to a media disc during operation. Load beam 104 has a bend with an angle with respect to base plate 108 of free state angle 116.

Head 102 includes read and write transducers, which are electrically shorted together with shunt tab 114 prior to testing. Shunt tab 114 flex circuit tail 112 and protects HGA 100 from ESD damage by ensuring that the read and write transducers are held at a common voltage potential. Shunt tab 114 must be broken or removed prior to testing HGA 100.

Base plate 108 is retained during testing to permit manipulation and alignment of HGA 100, and eventually, is mechanically fastened into a disc drive. Boss hole 110 and tooling hole 106 are used for aligning HGA 100. As described in greater detail with respect to FIGS. 2-5, during testing flex circuit tail 112 is secured with a HGA tail control device to inhibit vibrations that may be transferred to head 102 and its read and write transducers. Reducing vibrations in head 102 may allow more accurate testing of HGA 100.

Figure 2A:
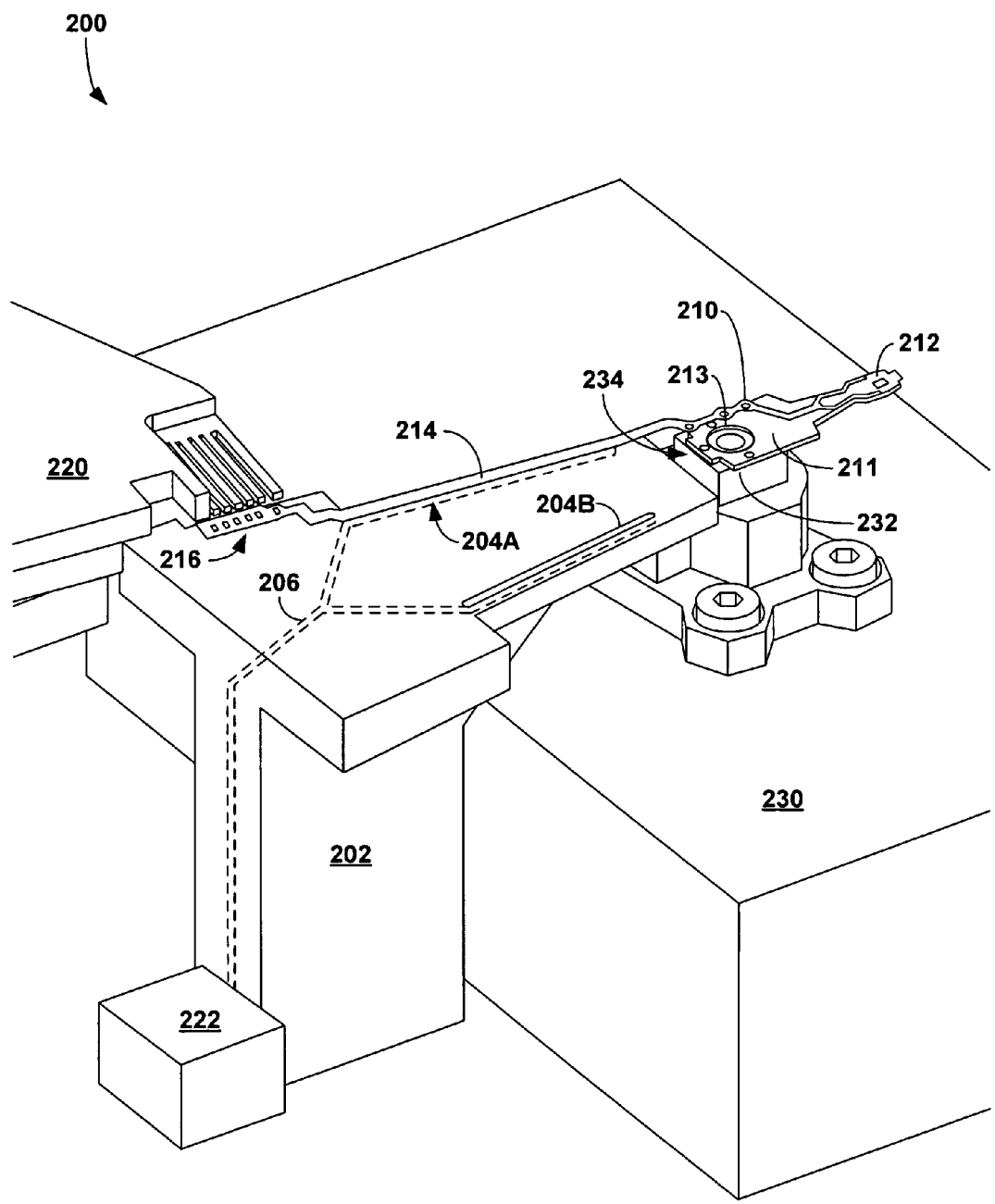
FIGS. 2A-2B illustrate an HGA test assembly with a HGA tail control device that utilizes a vacuum channel to control tail motion during testing of an HGA.
Figure 2B:
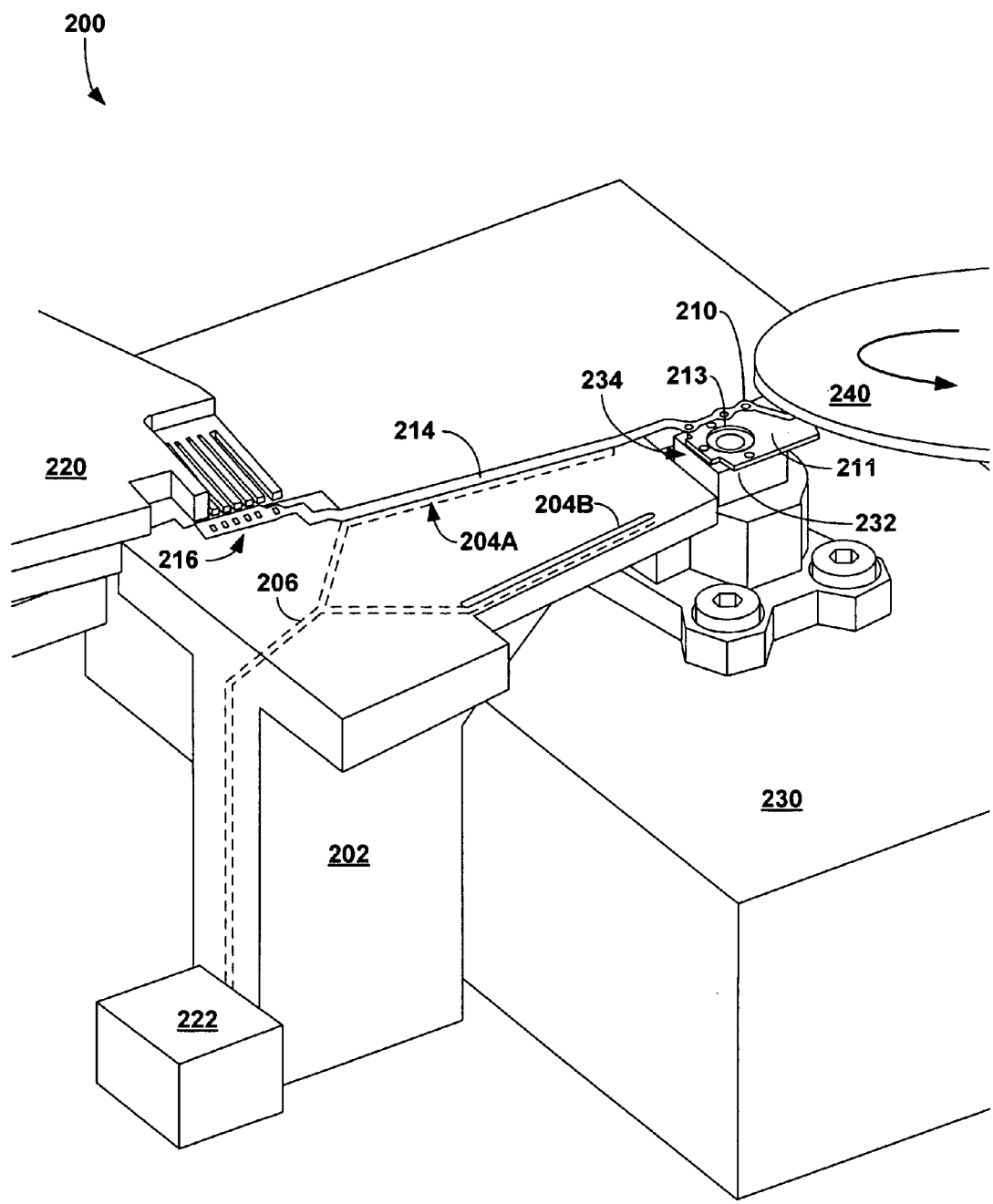

FIGS. 2A-2B illustrate HGA test assembly 200 and HGA 210. Specifically, FIG. 2A illustrates HGA 210 mounted on HGA test assembly 200, while FIG. 2B shows HGA 210 mounted on HGA test assembly 200 and loaded on rotating test disc 240. HGA 210 includes base plate 211 with boss hole 213. HGA 210 also includes head 212, tail 214 and contacts 216. HGA test assembly 200 includes HGA tail control device 202, which uses suction to secure tail 214 to HGA tail control device 202 to inhibit vibration in tail 214 during testing of HGA 210.

HGA 210 is mounted on nest 232, which serves as a support platform for HGA 210. Nest 232 is mounted on base 230. HGA 210 is mounted precisely on mounting surface 234 of nest 232 via boss hole 213. HGA 210 also includes one or more tooling holes (not shown). Boss hole 213 and the one or more tooling holes line up a boss hole pin and alignment pins on mounting surface 234. Techniques for precisely mounting an HGA are described in United States Patent Publication 2005/020979 by Anderson et al., the entire content of which is incorporated herein by reference. Techniques to precisely locate HGA 210 on nest 232 other than those described in United States Patent Publication 2005/020979 by Anderson et al. are also possible.

HGA tail control device 202 is mounted on base 230 such that it has a fixed position relative to nest 232. HGA tail control device 202 includes vacuum channel 206 with openings 204A and 204B (hereinafter "openings 204"). Opening 204A inhibits vibration in tail 214 during testing of HGA 210, while opening 204B is useful to inhibit motion in an HGA with a different shape than HGA 210. Vacuum channel 206 is connected to vacuum source 222. For example, vacuum source 222 may be a common vacuum source that is also used to operate pneumatic actuators used to move one or more components of HGA test assembly 200. As another example, vacuum source 222 may simply be a dedicated air pump. To avoid ESD and/or electric contact with HGA 212, HGA tail control device 202 may be made from a static dissipative material.

For testing of HGA 210, HGA 210 first mounted on nest 232. Then, electrical connection device 220 is moved to connect to contacts 216 on HGA 210 to provide a communication path between testing circuitry and head 212. Next, head 212 is loaded on rotating test disc 240. Head 212 may be loaded on rotating test disc 240 by moving either test disc 240 or nest 232 into a proper position. After loading head 212 on test disc 240, testing of HGA 210 begins. For example, testing may include performing read and/or write operations on test disc 240 with HGA 210.

During testing, the rotation of test disc 240 produces air currents, which may excite vibrations in tail 214. HGA tail control device 202 inhibits vibration in tail 214 resulting from these air currents and from other sources. By inhibiting vibration in tail 214, vibration in head 212 is reduced, which may increase the precision and accuracy of tests performed on HGA 210 by HGA test assembly 200.

Figure 3A:
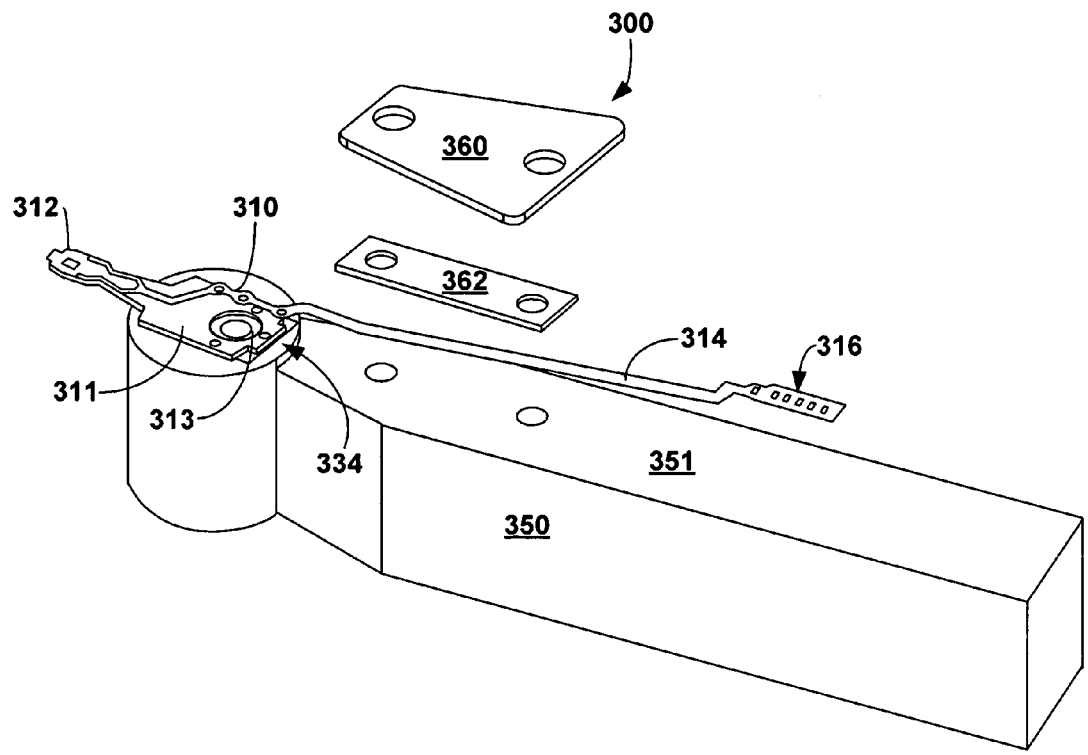
FIGS. 3A-3B are conceptual illustrations of an HGA test assembly load arm with a HGA tail control device that constrains an tail between a plate and a test arm that supports the HGA.
Figure 3B:
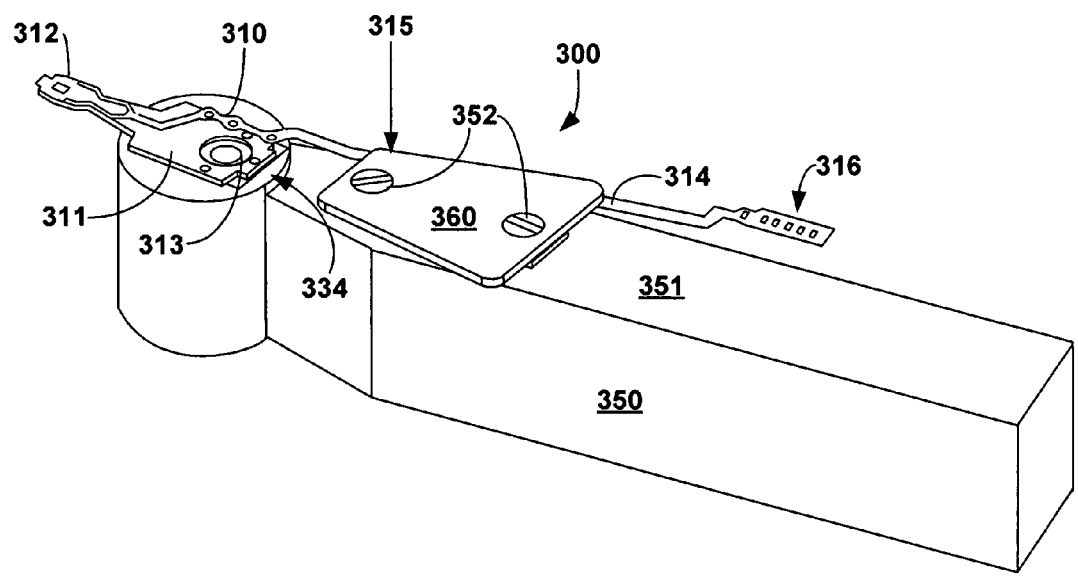

FIGS. 3A-3B are conceptual illustrations HGA test assembly load arm 350 and HGA 310. HGA test assembly load arm 350 includes HGA tail control device 300, which inhibits vibration in tail 314 during testing of HGA 310. HGA test assembly load arm 350 is part of an HGA test assembly in which load arm 350 is moved into position to load HGA 310 on a test disc that rotates on a fixed axis. FIG. 3A includes an exploded view of HGA tail control device 300, while FIG. 3B includes a perspective view of HGA tail control device 300. HGA 310 includes base plate 311 with boss hole 313. HGA 310 also includes head 312, tail 314 and contacts 316.

HGA test assembly load arm 350 provides mounting surface 334, which serves as a support platform for HGA 310. Base plate 311 of HGA 310 is mounted precisely on mounting surface 334 of HGA test assembly load arm 350 using boss hole 313 and one or more tooling holes (not shown).

HGA tail control device 300 includes plate 360, shim 362 and screws 352. Plate 360 and surface 351 of HGA test assembly load arm 350 are each substantially flat. HGA tail control device 300 constrains tail 314 between plate 360 and surface 351 of HGA test assembly load arm 350. Plate 360 functions to block air currents, e.g., from a rotating test disc, in order to inhibit vibration in tail 314. Plate 360 also reduces vibrations in tail 314 by pressing tail 314 down slightly to create node 315.

In some embodiments, shim 362 may be approximately the same thickness as tail 314 to prevent tail 314 from being compressed by HGA tail control device 300. Compressing tail 314 from plate 360 could distort electrical signals or the position of head 312 relative to a test disc (not shown) during testing of HGA 310. In other embodiments, shim 362 may be thinner than tail 314 to slightly compress tail 314. This slight compression may further inhibit vibration in tail 314 during testing.

In further embodiments, shim 362 may be slightly larger than tail 314. For example, tail 314 may have a thickness of 0.003 inches while shim 362 may have a thickness of approximately 0.005 inches. This facilitates sliding tail 314 between surface 351 and plate 360. In this instance, tail 314 is constrained between mounting surface 334 and a surface supporting contacts 316 (not shown). Plate 360 serves to reduce vibrations in tail 314 by shielding tail 314 from air currents and by pressing tail 314 down slightly to create node 315. To avoid ESD and/or electric contact with head 312, plate 470 and surface 451 may include static dissipative materials encompassing HGA 310.

Figure 4:
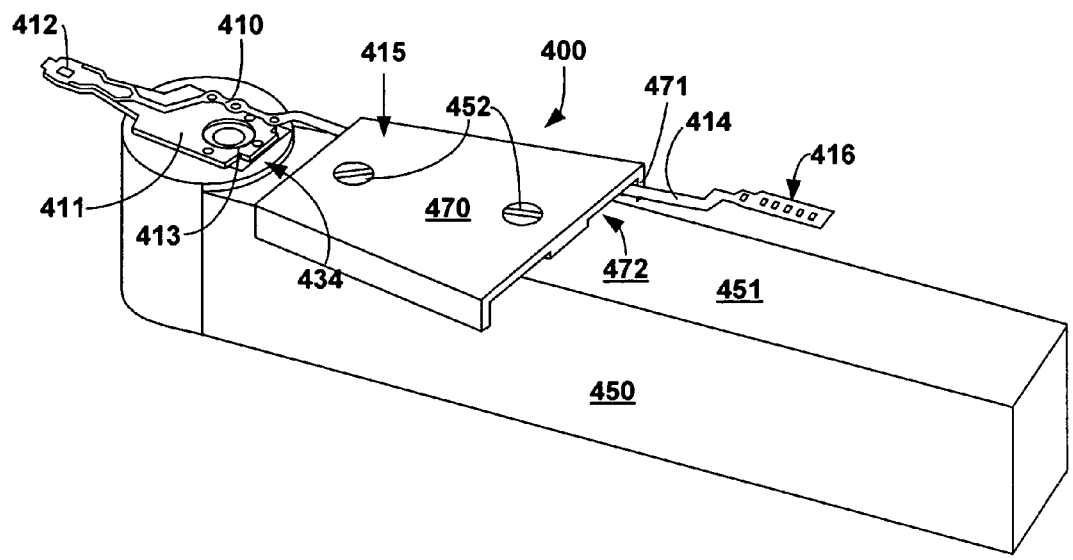
FIG. 4 is a conceptual illustration of an HGA test assembly load arm with a HGA tail control device that constrains an tail between a part including a channel sized to encompass a cross section of the HGA and a test arm that supports the HGA.

FIG. 4 is a conceptual illustration of HGA test assembly load arm 450 and HGA 410. HGA test assembly load arm 450 is part of an HGA test assembly in which load arm 450 is moved into position to load HGA 410 on a test disc that rotates on a fixed axis. HGA 410 includes base plate 411 with boss hole 413, head 412, tail 414 and contacts 416. HGA test assembly load arm 450 includes HGA tail control device 400 to inhibit vibration in tail 414 during testing of HGA 410. HGA tail control device 400 functions in a similar manner to HGA tail control device 300 (FIGS. 3A-3B). One difference is that HGA tail control device 400 includes flange 471, which functions to further shield tail 414 from air currents.

HGA test assembly load arm 450 provides mounting surface 434, which serves as a support platform for HGA 410. Base plate 411 of HGA 410 is mounted precisely on mounting surface 434 of HGA test assembly load arm 450 using boss hole 413 and one or more tooling holes.

HGA tail control device 400 includes plate 470 and screws 452. Plate 470 includes groove 472, which is sized to hold tail 414. HGA tail control device 400 constrains tail 414 between plate 470 and surface 451 of HGA test assembly load arm 450. Plate 470 functions to block air currents, e.g., from a rotating test disc, in order to inhibit vibration in tail 414. Plate 360 also reduces vibrations in tail 414 by pressing tail 414 down slightly to create node 415.

In different embodiments, groove 472 may be slightly thinner than the thickness of tail 414, approximately the same thickness as tail 414 or thicker than tail 414. To avoid ESD and/or electric contact with HGA 412, plate 470 and surface 451 may include static dissipative materials surrounding tail 414.

Figure 5:
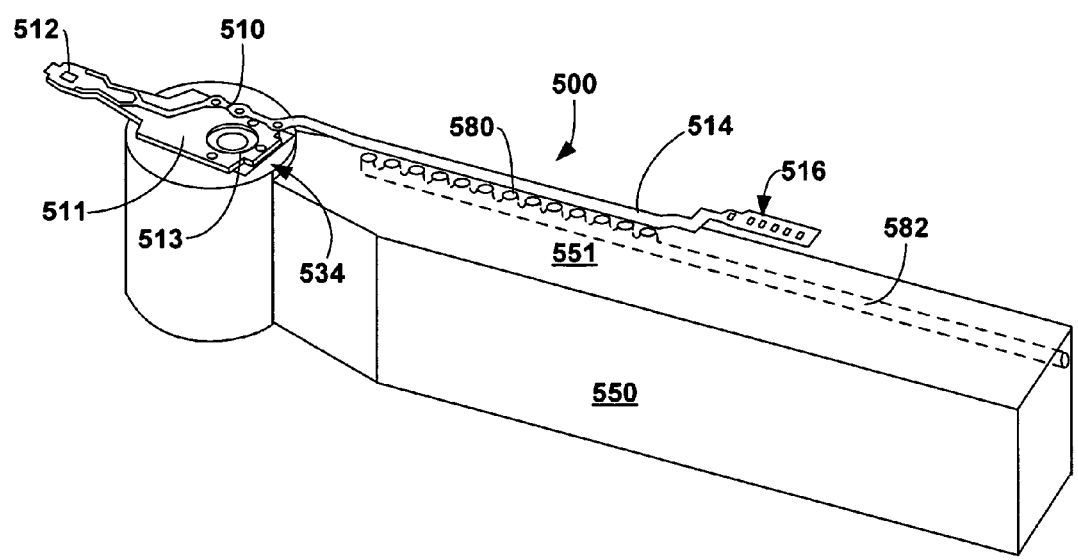
FIG. 5 is a conceptual illustration of an HGA test assembly load arm with a HGA tail control device that utilizes a vacuum channel with multiple openings to control tail motion during testing of an HGA.

FIG. 5 is a conceptual illustration of HGA test assembly load arm 550 and HGA 510. HGA test assembly load arm 550 is part of an HGA test assembly in which load arm 550 is moved into position to load HGA 510 on a test disc that rotates on a fixed axis. HGA 510 includes base plate 511 with boss hole 513, head 512, tail 514 and contacts 516. HGA test assembly load arm 550 includes HGA tail control device 500, which inhibits vibration in tail 514 during testing of HGA 510.

HGA test assembly load arm 550 provides mounting surface 534, which serves as a support platform for HGA 510. Base plate 511 of HGA 510 is mounted precisely on mounting surface 534 of HGA test assembly load arm 550 using boss hole 513 and one or more tooling holes (not shown).

HGA tail control device 500 inhibits vibration in tail 514 and HGA 510 by holding tail 514 to surface 551 via openings 580 of vacuum channel 582. Vacuum channel 582 is connected to a vacuum source to provide suction at openings 580. Inhibiting vibration in tail 514 may increase the precision and accuracy of tests performed on HGA 510. To avoid ESD and/or electric contact with HGA 512, surface 551 may comprise a static dissipative material.

In other embodiments, an HGA tail control device may be separate from HGA test assembly load arm 550. For example, an HGA tail control device may be a vacuum channel with openings used to hold tail 514 of a part that is on the side of the test arm instead of within the test arm itself.

Various embodiments of the invention have been described. However, various modifications can be made to the described embodiments. For example, embodiments were described in which HGAs were secured to a support platform configured to hold a base plate of the HGA independently of a HGA tail control device. In other embodiments, the HGA tail control device may be integrated with the support platform. For example, the support platform may include an opening to a vacuum channel to hold the base plate of the HGA. The vacuum channel on the support platform may also secure the tail of the HGA using the same or different openings used to hold the base plate. Other modifications to the described embodiments may also be made within the spirit of the invention. These and other embodiments are within the scope of the following claims.

The invention claimed is:

1. An assembly for testing a head gimbal assembly (HGA) comprising:
    a support platform configured to hold a base plate of the HGA;
    a rotatable test disc; and
    a HGA tail control device configured to constrain a tail of the HGA, the HGA tail control device including a flange that shields the tail of the HGA from air currents due to rotation of the rotatable test disc.

2. The assembly of claim 1, wherein the HGA tail control device comprises a static dissipative material.

3. The assembly of claim 1, wherein the HGA tail control devices include a first component and a second component, the tail of the HGA being constrained between the first and second components.

4. The assembly of claim 3, wherein the first component is a tester arm that includes the support platform, and wherein the second component includes the flange.

5. The assembly of claim 3, wherein the tail is pinched between the first component and the second component.

6. The assembly of claim 3, wherein the second component is a substantially flat plate that includes the flange.

7. The assembly of claim 3, wherein the second component includes the flange, and further includes a groove sized to hold the tail.

8. The assembly of claim 3, further comprising a spacer between the first component and the second component.

9. The assembly of claim 8, wherein a thickness of the spacer is greater than a thickness of the tail.

10. A test assembly for a head gimbal assembly (HGA), the assembly comprising:
    a load arm;
    a planar mounting surface at a distal end of the load arm, wherein the mounting surface comprises an arrangement of alignment pins; and
    an HGA tail control device fixed relative to a medial region of the load arm, wherein the tail control device comprises a substantially flat plate mounted in a plane generally parallel to a plane of the mounting surface, wherein the plate comprises a surface adjacent to the load arm, and wherein the surface comprises at least one flange extending downward toward the control arm and generally normal to the plane of the hat plate.

11. The test assembly of claim 10, wherein the HGA tail control device comprises:
    a first flange on a first side of the flat plate;
    a second flange on a second side of the flat plate opposite the first side; and
    a central flange between the first flange and the second flange;
wherein the first flange and the central flange form a first groove adjacent the load arm and the second flange and the central flange form a second groove adjacent the load arm.

12. The test assembly of claim 10, further comprising a spacer plate between the load arm and the HGA tail control device.

13. The test assembly of claim 10, further comprising a rotatable test disc adjacent to the planar mounting surface.

* * * * *